Feb. 27, 1968   C. L. ISBORN ET AL   3,371,339
READOUT DEVICE

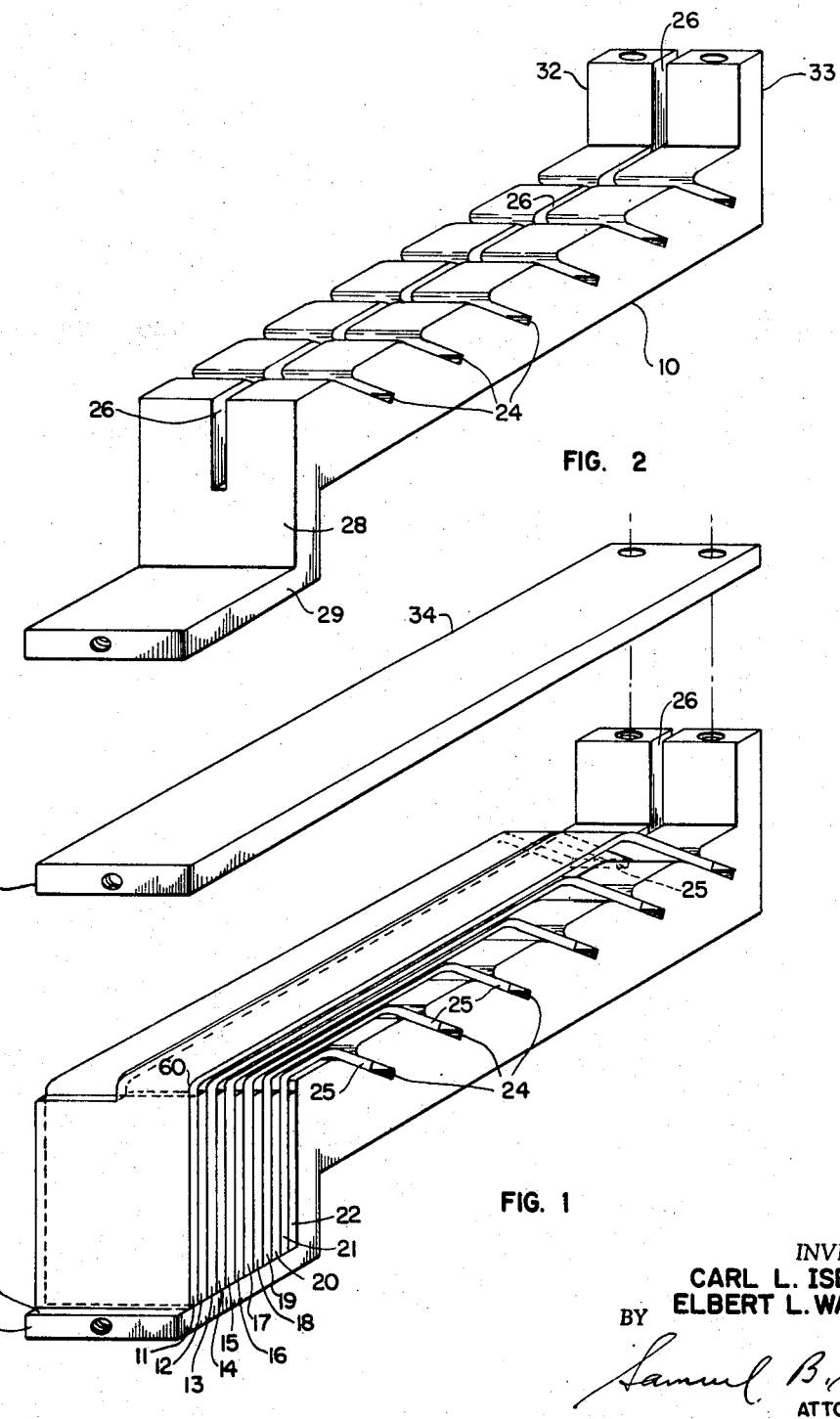

Filed Jan. 15, 1965   2 Sheets-Sheet 2

INVENTORS
CARL L. ISBORN
BY ELBERT L. WARREN

ATTORNEY

United States Patent Office 3,371,339
Patented Feb. 27, 1968

3,371,339
READOUT DEVICE
Carl L. Isborn, San Pablo, and Elbert L. Warren, Richmond, Calif., assignors to Beckman Instruments, Inc., a corporation of California
Filed Jan. 15, 1965, Ser. No. 425,784
10 Claims. (Cl. 340—378)

ABSTRACT OF THE DISCLOSURE

A stack of translucent plates are adapted to be illuminated along one edge for visual display of characters etched thereon. The light sources selectively energized for display of the characters are disposed in a supporting member extending rearwardly from the stack. A tab extends rearwardly from each plate to a groove in the supporting member to pipe light from an associated source to the edge of the plate.

---

This invention relates to visual indicators or readout devices and more particularly to a new and improved multi-symbol visual indicator.

It is desirable to have means for visually indicating various indicia, such as, arabic symbols and decimal digits 0 through 9, and at the same time have each indicia appear to emanate from the same area. There are various types of visual indicators presently utilized, among which are the electroluminescent type, gaseous tube type and stacked plate type. Stacked plate indicators, to which the present invention pertains, typically include a plurality of superimposed thin plates of plastic material which are capable of internally reflecting light which has entered the material. Each plate has inscribed thereon lines forming a symbol, numeral, etc., to be displayed, and a lamp is associated with each plate in a manner to efficiently transmit light into the plate. Light within the plate is scattered by the inscribed surface which then appears as an illuminated symbol.

Indicators of this nature frequently are employed in electrical instruments, with one or more such devices being mounted on the front panel thereof. Examples of such instruments are counters and digital voltmeters which include such indicators to readily provide rapid visual readout, in digital form, of the output of the instrument. It is, of course, desirable for the visual indicator to be easy to read from normal viewing angles, relatively compact so as not to require excessive space on the front panel of the instrument, and reasonably economical to manufacture. Prior art stacked plate indicator devices have been characterized by one or more drawbacks. The typical prior art indicator device is relatively large and bulky, and requires a considerable amount of front panel space and space within the instrument. Attempts have been made to reduce the size of such indicator devices by employing light piping techniques within the indicator device. Prior art devices employing such light piping techniques presently known frequently are larger than is desirable, and additionally require considerable care in the bending of the plates and in the assembly of the indicator device.

It is accordingly an object of the present invention to provide an improved visual indicator device which is relatively compact and easy to manufacture.

An additional object of the present invention is the provision of a novel stacked plate indicator employing a more compact light piping arrangement.

A further object of the present invention is the provision of a novel stacked plate indicator employing improved light piping techniques and improved silhouette indicia characterized by outstanding legibility, format flexibility and brightness-to-obstruction ratio.

In accordance with an exemplary embodiment of the teachings of the present invention, a stacked plate indicator is provided which employs light piping techniques. A plurality of plates with indicia inscribed thereon are mounted in an indicator or readout block. The indicia is formed on each plate by lightly inscribing double lines forming the particular indicia. Each of these plates includes a viewable portion upon which the indicia is inscribed, and a tab portion which extends from the viewable portion. The viewable portion of the plates are stacked adjacent each other, with the tabs extending rearwardly thereof into slots in the readout block. Adjacent plates have the tabs thereof extending from alternate sides, such that the tabs of adjacent plates extend substantially side by side (but spaced apart slightly) to adjacent slots in the readout block. A similar plurality of lamps are mounted in the block adjacent the ends of the tabs of the plates, and when a particular lamp is energized, reflections by the inscribed indicia thereon cause the indicia to become illuminated. By the use of tabs on the plates, with adjacent plates having tabs on opposite sides thereof, a twin light piping arrangement from the lamps to the portions of the plates having the indicia thereon is provided. This arrangement allows both a compact structure to be provided and one which is relatively simple to construct.

Other features and objects of the invention will be better understood from a consideration of the following detailed description when read in conjunction with the attached drawings in which:

FIG. 1 is a partially exploded view of an indicator constructed in accordance with the teachings of the present invention;

FIG. 2 illustrates the indicator block shown in FIG. 1 with the plates removed therefrom;

Figure 3:
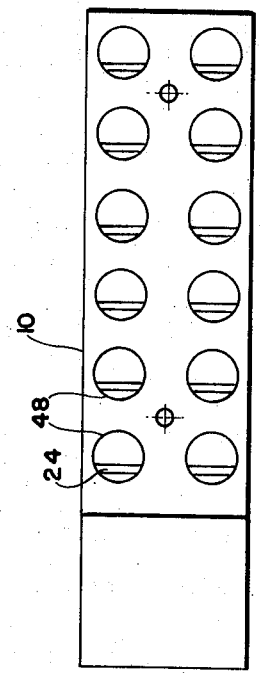
FIG. 3 is a bottom view of the indicator block and illustrates the holes into which lamps are placed.

Referring now to the drawings, FIG. 1 illustrates an indicator device constructed in accordance with the teachings of the present invention including an indicator block, cover for the indicator block and a plurality of plates. The indicator block is generally designated by reference numeral 10, and this block is also illustrated in FIG. 2 with the plates removed therefrom. Twelve plates 11 through 22 which may be fashioned from a suitable plastic, such as Lucite, are shown positioned on the block 10 in FIG. 1. Illustrative plates, before bending, are shown in FIGURE 5.

According to a feature of the invention, a number of angled grooves 24 are provided in the main body of the block 10 (FIGS. 1, 2 and 3) for receiving the tabs of the plates 11 through 22. A longitudinal slot 26 is provided along the length of the block 10 for the insertion of a light baffle (not shown) which will be described in greater detail subsequently. The block 10 further includes a front face 28 and projection or ledge 29 for supporting, in stacked relationship, the viewable portion of the plates upon which indicia is inscribed. The rear end of the block 10 includes uprights 32 and 33 to which a cover 34 may be attached by means of screws or other suitable attaching means (not shown). As will be apparent to those skilled in the art, the block may be made from any suitable material, such as aluminum, and may be formed in various ways, as by casting or extruding. A front plate or cover (not shown) which may frame the front and cover the sides of the block and plates may be provided and attached, for example, to the front ends 36 and 38 of the cover 34 and block 10, respectively.

Figure 4A:
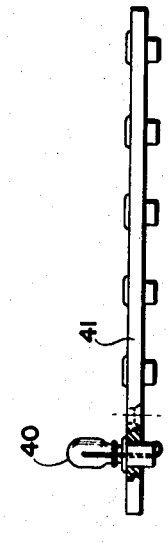
FIGS. 4a and 4b illustrate respectively a side and bottom view of a lamp assembly.
Figure 4B:
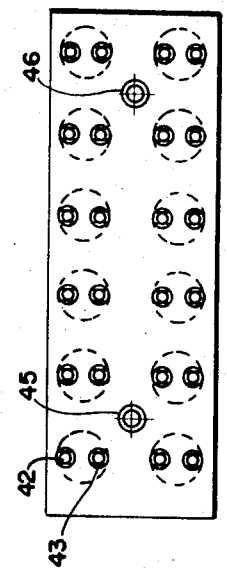

FIG. 4a illustrates a lamp assembly which may include a plurality of lamps (only one lamp 40 being shown for simplicity of illustration). The lamp assembly includes a lamp mounting board 41 to which are attached a plurality of lamp sockets which may each take the form of a pair of eyelets 42 and 43. This board may be an etched circuit board with conductive eyelets if desired. The leads from each lamp may be inserted through the eyelets and soldered to provide mechanical support and electrical connections for the lamps. Suitable conductive leads may be attached to the eyelets for electrical connection to the lamp driving circuitry. The lamp assembly shown in FIG. 4a may be attached to the block 10 (see FIG. 3) with suitable screws (not shown) applied through holes 45 and 46 in the lamp mounting board 41 into suitably threaded holes in the block 10. The lamps 40 are thus located in holes 48 formed, such as by drilling or molding, in the block 10. After the plates are assembled with the block 10, with the tabs 25 of the plates being suitably positioned in the grooves 24, the lamps will be adjacent the ends of the tabs 25. When a lamp is lit adjacent the edge of the tab 25, the light from the lamp is "piped" through the tab of the plate and serves to illuminate any indicia inscribed on the plate.

Figure 5:
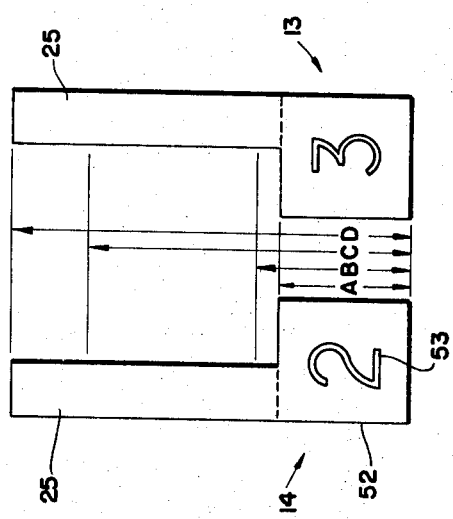
FIG. 5 illustrates exemplary indicator plates with silhouette type indicia inscribed thereon.

FIG. 5 illustrates two typical plates which may be used in the arrangement shown in FIG. 1. The plate 14, for example, includes a lower viewable portion 52 upon which the numeral "2" is inscribed, and a tab 25. Plates which are located adjacent each other have tabs 25 on opposite sides thereof as shown in FIG. 5. The numerals are in a silhouette form, being provided by two finely inscribed lines which provide greater legibility of all indicia presented by the indicator device. A typical line, identified by a numeral 53 in FIG. 5, may be, for example, five mils wide and five mils deep. The separation between the lines forming a numeral or symbol, which may be termed the stroke width, may be approximately sixty mils. Typical numeral height is five hundred mils. The fine double inscribed symbol provides greater illumination than a single heavy inscribed symbol, and additionally creates less obstruction to the symbols falling toward the back of the stack of plates (that is, those symbols on the plates closest to the front face 28 of the block 10).

Because of certain physical and physiological facts, the silhouette form of inscription provides greatly improved indicia presentation. Assuming that a given line is illuminated brightly enough such that the human eye can perceive its existence, there is no lower limit to the narrowness of the line width. Additionally, the apparent width of a very fine line is a function of the brightness of illumination thereof. In theory, a very thin and very brightly illuminated line appears to be a heavy or wide line when illuminated, but when unilluminated the line appears to disappear and thus presents no obstruction to further displaced indicia falling behind and within the same area of view. Furthermore, two fine lines in close proximity on the surface of the plate provide more than twice the brightness of a single line of the same dimensions. This increase in brightness results from additional multiple reflections and reinforcement and leads to the conclusion that a greater brightness-to-obstruction ratio is obtained with a multiple line inscription of proper proportions, with the practical number of lines being essentially determined by inscription methods.

The plates are suitably bent so that the tabs thereof extend into the grooves 24 in the block. Exemplary longitudinal dimensions for a typical set of plates are given in the table below, wherein letters A, B, C and D correspond to the same letters shown in FIG. 5 for identifying the various dimensions of the plates. The height of the viewable portion of the plate upon which the indicia is inscribed is identified by the letter A. The letter B identifies the location of the first bend (identified by numeral 60 in FIG. 1), and this bend may be ninety degrees. The letter C identifies the location of the second bend provided to allow the tab 25 to fit into the groove 24 in the lamp block 10. This bend may be typically approximately forty-eight degrees. It will be noted that the respective bend angles of each plate are the same thereby simplifying manufacture of the plates. The letter D identifies the over-all length of the plate.

| Reference Numeral | Symbol | Dimension (in inches) | | | |
|---|---|---|---|---|---|
| | | A | B | C | D |
| 11 | Dec. Pt. | 1½₂ | 1³⁄₃₂ | 2³⁰⁄₃₂ | 3¹⁸⁄₃₂ |
| 3 | 3 | 1 | 1½₂ | 2¹⁸⁄₃₂ | 3½₂ |
| 15 | 9 | 3½₂ | 1 | 2⁹⁄₃₂ | 2²³⁄₃₂ |
| 17 | 5 | 3⁰⁄₃₂ | 3½₂ | 1²⁶⁄₃₂ | 2⁹⁄₃₂ |
| 19 | 7 | 2⁹⁄₃₂ | 3⁰⁄₃₂ | 1¹⁴⁄₃₂ | 1²³⁄₃₂ |
| 21 | 1 | 2⁸⁄₃₂ | 2⁹⁄₃₂ | 1 ²⁄₃₂ | 1¹⁴⁄₃₂ |
| 12 | 6 | 1½₂ | 1²⁄₃₂ | 2⁹⁄₃₂ | 3¹⁷⁄₃₂ |
| 14 | 2 | 1 | 1½₂ | 2¹⁷⁄₃₂ | 3³⁄₃₂ |
| 16 | 0 | 3½₂ | 1 | 2⁵⁄₃₂ | 2²²⁄₃₂ |
| 18 | 8 | 3⁰⁄₃₂ | 3½₂ | 1²⁵⁄₃₂ | 2⁸⁄₃₂ |
| 20 | 4 | 2⁹⁄₃₂ | 3⁰⁄₃₂ | 1¹³⁄₃₂ | 1²⁷⁄₃₂ |
| 22 | | 2⁸⁄₃₂ | 2⁹⁄₃₂ | 1½₂ | 1¹³⁄₃₂ |

The width of the tab 25 is less than half the overall width of the portion 52 of the plate in order to allow for the insertion of a light baffle (not shown) along the length of the indicator device in the slot 26. This light baffle, which may be a piece of aluminum foil, other metal, or suitable opaque material, serves to isolate the side edges of the tabs along the left side of the indicator device from those along the right side in order to prevent light transfer therebetween. Thus, a single light baffle, or baffle plate, allows the shielding of the right-hand and left-hand tabs or light pipes. The use of such adjacent light pipes allows the provision of more plates (and, consequently, more indicia) in a readout device occupying a smaller vertical space. Thus, larger indicia can be provided in a given panel space than heretofore.

The double line inscribed numerals provide greater legibility of rear indicia because of the reduced obstruction of the fine lines. These lines may be inscribed, or impressed into each plate, typically on the back side thereof. The use of double lines allows various styles of numerals and other indicia to be provided with an optimum stroke width to numeral height. Conventional indicia shapes can be provided to facilitate fast and error-free reading thereof.

One of the salient features of the present invention is that the longest light paths (such as is provided for the plate 11 in FIG. 1) feed the front-most indicia (those closest to the observer) which require the least amount of illumination. The rear indicia are fed through shorter light paths and provide brighter indicia to overcome the minimum obstruction presented by the forward plates. It will be appreciated that fewer or greater indicia may be provided by employing a different number of plates. Different size blocks, particularly shorter or longer, may be used.

Since the lower end (FIG. 5) of each plate is adjacent the ledge 29 (FIGS. 1 and 2), all indicia may be inscribed at the same distance from this end of the plate thereby simplifying the positioning of indicia thereon. Additionally, this feature allows a greater useful vertical angle of view since the normal angle of view of such a readout (when installed on an instrument) is downward. Furthermore, the viewing angle of a readout device constructed in accordance with the present invention is away from rather than into the light source.

A suitable filter, such as a polarizing plastic plate, may be provided in front of the forward indicia-bearing plate (plate 11 in FIG. 1) to reduce unwanted reflections from external light sources. Additionally, the edges (and particularly the edges of the indicia-bearing portion 52) of each plate may be covered or coated with a suitable material to enhance the reflections within the plates and increase the efficiency thereof. Such a covering material may also be applied slightly past the edges onto the faces of the plates in order to provide a minute separation between the faces of the plates to thereby reduce any chance of light transfer therebetween. It is sometimes advantageous to likewise cover the bends in the plates. A suitable material for this purpose is thin aluminum foil which is blackened on one side, with the shiny surface of the aluminum foil being positioned adjacent the edge of the plate.

Although particular structures and plate dimensions, etc., have been discussed in connection with a specific exemplary embodiment of an indicator constructed in accordance with the teachings of the present invention, others may be utilized. Furthermore, it will be understood that although an exemplary embodiment of the present invention has been disclosed and discussed, other structures and applications are possible and that the embodiment disclosed may be subjected to various changes, modifications and substitutions without necessarily departing from the spirit of the invention.

What is claimed is:

1. A multi-symbol visual indicator comprising a member for supporting a plurality of stacked plates of transparent material for internally reflecting light within said plates, each plate having a symbol thereon, an individual source of light located adjacent an edge thereof, said plates being superimposed one behind the other thereby substantially superimposing said symbols such that as each symbol is illuminated it may be observed from substantially the same area at the front of said indicator, the improvement comprising:
   each of said plates including a viewable portion upon which said symbol is located, and a tab portion,
   said support member having an L shaped forward portion upon which the viewable portion of said plates are arranged, and a body portion including a plurality of grooves therein in which said tabs are located,
   said body portion including recesses adjacent the respective grooves for receiving each individual source of light,
   the tabs on plates having their viewable portions adjacent extending from opposite sides of said viewable portions, these tabs being bent and the ends thereof located in substantially side by side grooves in said body portion, and
   at least said body portion of said member including a longitudinal slot for receiving a baffle for optically isolating the tabs of adjacent plates.

2. A visual indicator as in claim 1 wherein
said body portion includes a plurality of grooves transverse to the longitudinal axis of said body portion, said grooves being substantially parallel, and
the individual sources of light being mounted on a board which is situated adjacent the bottom of said body portion for retaining the sources of light in said recesses.

3. A visual indicator as in claim 1 wherein
the symbols on at least certain of said plates is in the form of fine double lines forming the particular symbol.

4. A visual indicator as in claim 3 wherein
each of said lines has a ratio of line width to line depth of approximately one to one, and a ratio of line width to line spacing of approximately twelve to one.

5. A visual indicator as in claim 3 wherein
each of said lines is approximately five mils wide at the surface of the plates and approximately five mils deep, and the separation between double lines is approximately sixty mils.

6. A multi-symbol visual indicator comprising an elongated member for supporting a plurality of stacked plates of substantially transparent material, each plate having a symbol thereon and an individual source of light associated therewith, said plates being superimposed one behind the other, the improvement comprising
   said elongated member including a body portion having a face at one end thereof,
   each of said plates having a tab forming a light pipe,
   said body portion of said member having on a surface normal to said face a plurality of transverse grooves, and
   said plates being stacked on said member substantially parallel to said face thereof, with the tabs of alternate plates extending longitudinally along one half of said body, and with the ends of said tabs being located in respective grooves in the one half of said body, some of said sources of light being mounted in holes disposed along an opposite side of said body, each hole passing through said body to a groove.

7. A visual indicator as in claim 6 wherein
the tabs of the remaining plates extend longitudinally along the other half of said body terminating in grooves therein, others of said sources of light being mounted in holes disposed along an opposite side of said body, each hole passing through said body to a groove, and
a baffle positioned on said member for optically isolating the tabs of the plates located on opposite halves of the body.

8. A visual indicator as in claim 6 wherein
said grooves are located at various distances from said face, and the tabs of the various plates have different lengths to allow the tabs to terminate in respective grooves.

9. A readout device comprising
a longitudinal block member having a plurality of transverse grooves therein,
a plurality of plates of substantially transparent material, each of said plates having a symbol inscribed thereon,
each of said plates having a tab forming a light pipe,
said plates being superimposed one behind the other thereby substantially superimposing said symbols, said plates being supported substantially parallel to a face at one end of said block member with the tabs of said plates extending to respective grooves in said block member on a surface normal to said face the tabs of adjacent plates extending along adjacent halves of said block member and terminating in substantially side-by-side grooves, each groove reaching a separate hole made from an opposite side of said block member, each hole being adapted to receive a selectively energizable light source.

10. A readout device as in claim 9 including
a baffle positioned longitudinally along said block member and serving to optically isolate the tabs of plates extending along adjacent halves of the block member.

References Cited

UNITED STATES PATENTS 2,751,584 6/1956 Isborn _____ 340—380
3,150,362 9/1964 Belanich _____ 340—378.1

FOREIGN PATENTS 847,972 9/1960 Great Britain.

LAWRENCE CHARLES, *Primary Examiner.*